Sept. 24, 1946.  J. D. CHRISTIAN  2,407,975
SPEED CHANGE UNIT
Filed Sept. 9, 1944  5 Sheets-Sheet 2

INVENTOR.
JOSEPH D. CHRISTIAN
BY
ATTORNEY

Sept. 24, 1946. J. D. CHRISTIAN 2,407,975
SPEED CHANGE UNIT
Filed Sept. 9, 1944 5 Sheets-Sheet 3

INVENTOR.
JOSEPH D. CHRISTIAN
BY
Robert N. Eckhoff
ATTORNEY

Sept. 24, 1946.　　J. D. CHRISTIAN　　2,407,975
SPEED CHANGE UNIT
Filed Sept. 9, 1944　　5 Sheets-Sheet 5

INVENTOR.
JOSEPH D. CHRISTIAN
BY
ATTORNEY

Patented Sept. 24, 1946

2,407,975

UNITED STATES PATENT OFFICE 2,407,975

SPEED CHANGE UNIT

Joseph D. Christian, San Francisco, Calif.

Application September 9, 1944, Serial No. 553,358

5 Claims. (Cl. 74—305)

This invention relates to power transmission devices, particularly to those intended for use on electric motors.

The National Electric Motor Association, generally designated "N. E. M. A.", provides standards which are observed by the various motor manufacturers. These standards apply to all sizes of motors utilized in usual commercial applications, the standards generally covering motors between ½ horsepower and 60 horsepower. Because of these standards, an electric motor user is able to substitute a motor made by one manufacturer for that made by another in all usual and ordinary applications. Motor speeds vary between about 450 and about 1800 R. P. M., the bulk of motors produced probably operating at speeds of about 1200 to 1800 R. P. M. for electrical reasons. In any case, the speed of the motor drive shaft is such that some means of speed reduction is generally interposed between the motor shaft and the unit to be driven. In accordance with this invention, I provide a power transmission and speed change device which can be mounted directly upon a motor shaft to provide a predetermined reduction. Inasmuch as the diameter and length of the shaft of any motor of a given horsepower is the same as that of any other motor made by another manufacturer, the device can be made up as such and sold as a packaged item for use with the motor of any manufacturer. The device is readily installed by being slipped into place upon the shaft and there secured. Power is taken off of the device by coupling direct to the device or else through a gear, pulley or sheave if a further change in speed between the driven element of the reduction device and the driven unit is desired.

While it is believed that the advantages of the device of this invention are readily apparent, it should be pointed out that many commercial devices are required which operate with power input shafts driven at speeds between about 300 and 100 R. P. M. By providing a simple reduction unit which can be mounted directly upon the motor shaft, one is able to purchase a standard motor and a standard reduction unit, assemble these without tearing down the motor or machining any of its parts to fit special couplings or other devices. Utilizing a standard motor of 1800 R. P. M. and a unit providing a 6 to 1 reduction, one is able to provide a drive input speed of 300 R. P. M. By utilizing readily available gear arrangements or the proper sizes of auxiliary pulleys between the unit and the machine to be driven one is able to effect readily a further reduction so that the unit can be driven with an input speed of between 300 and 100 R. P. M. This practically will cover a vast number of the speed reduction drive problems encountered.

It is in general the broad object of the present invention to provide a novel, simple form of power transmission device which can be mounted directly upon and utilized to provide a reduction and drive from the power take-off shaft of a standard electric motor.

Another object of the present invention is to provide a novel form of power transmission device.

A further object of the present invention is to provide an improved construction in a power transmission device which is mounted directly upon an electric motor shaft without alteration of the shaft.

The invention includes other objects and features of advantage, some of which, together with the foregoing, will appear hereinafter.

In the drawings accompanying and forming a part hereof, Figure 1 is a side elevation partly in section illustrating the reduction-transmission unit of this invention mounted in place upon a motor shaft.

Figure 1:
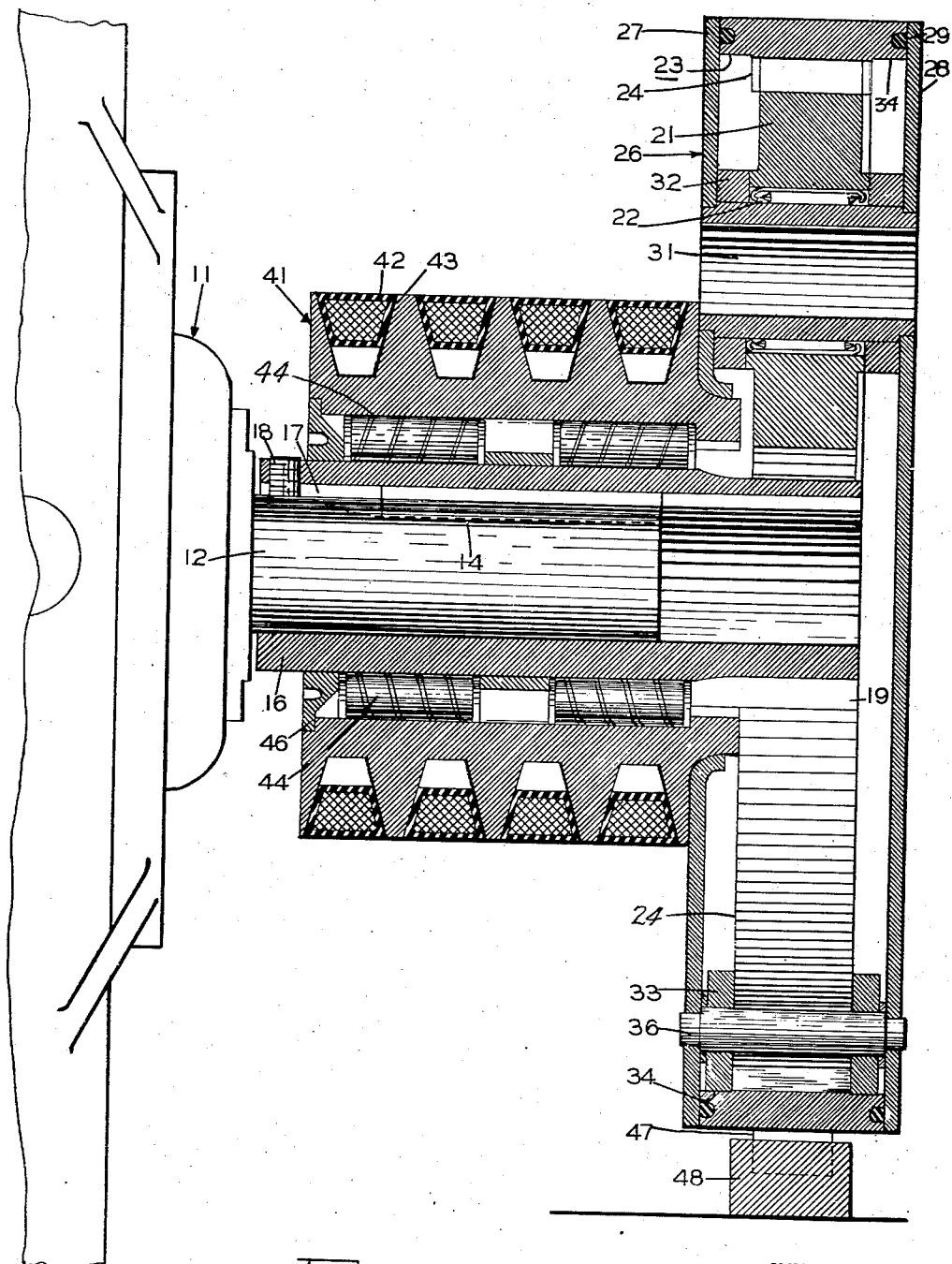
Figure 2:
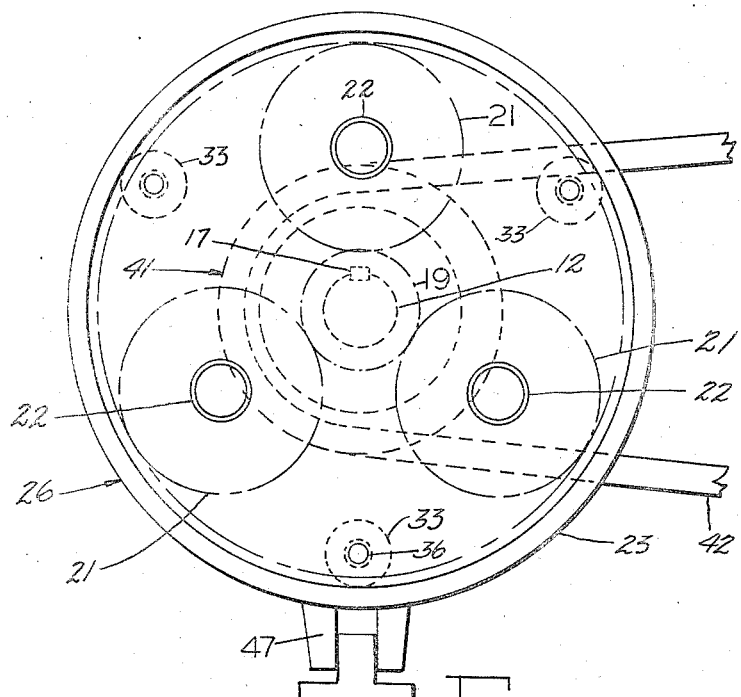
Figure 2 is an end elevation of the structure shown in Figure 1.

Referring to Figures 1 and 2, a standard electric motor is shown at 11 with its extending shaft 12. The motor and its shaft are constructed according to certain standards of the National Electric Motor Association and such characteristics as the length of shaft, its diameter, the keyway 14 cut in the shaft, the height of the center of the shaft above the motor base and other factors and dimensions conform to these standards.

Mounted upon the extending end of the shaft 12 is a bushing 16. A key 17 is positioned between the bushing and the shaft, the bushing being secured to the shaft by a set screw or other locking device 18. The length of the bushing is such that it overhangs and extends beyond the end of the shaft to provide a support for a pinion gear 19 which is supported on and secured to the bushing. Spaced about the pinion gear are three planet gears 21. These are mounted upon suitable bearings indicated at 22 and shown in the form of roller bearings. An outer ring 23 is positioned about the planet gears with gear teeth 24 formed on the interior periphery of the ring to provide a ring gear in mesh with the three planet gears.

To support the planet gears in position I provide a casing generally indicated at 26 and made up of two opposite circular wall members 27 and 28. These are sealed as at 29 to the ring 23 to retain a lubricant placed within the casing. Tubular members 31 are mounted in the casing to provide a support for each of the planet gears and their bearings, spacers 32 being provided between the planet gears, their bearings and the walls of the casing.

To insure that any wear or forces acting between the planet gears and the ring does not result in an eccentric movement, guide rollers 33 are mounted on each side of the ring gear to run in tracks 34 provided on each side of the ring gear. The rollers are mounted in pairs upon each side of the ring gear on shaft 36.

Secured to the casing and adapted to rotate with the casing is a suitable power take-off unit indicated generally at 41. In the form of the invention shown in Figure 1, I have indicated this as a multi-groove sheave carrying several V-belts 42 in suitably formed grooves 43. Roller bearings 44 are mounted between the power take-off device and the bushing 16, these being suitably mounted and retained in place as by retainer 46. Any other type of power take-off device can be utilized, such as a gear, a sheave, pulley or other device.

To retain the ring gear against rotation, any suitable means can be employed, and I have indicated depending lugs 47 as formed on the casing and engaged with a fixed support 48.

In operation, pinion 19 rotates with the motor shaft 12 to which it is directly connected through the bushing 16. Rotation of the pinion in turn drives the several planet gears. Since the ring gear 23 is held against rotation, the planet gears rotate about the pinion gear and since the power take-off element 41 is connected to the supporting means for the planet gears, it in turn is rotated but at the reduced speed of the planet gears. The size of these can be varied. However, it is contemplated that generally only one reduction in size will be made for a given horsepower motor, any further modification in speed transmission being effected between the power take-off 41 and the driven unit.

Figure 3:
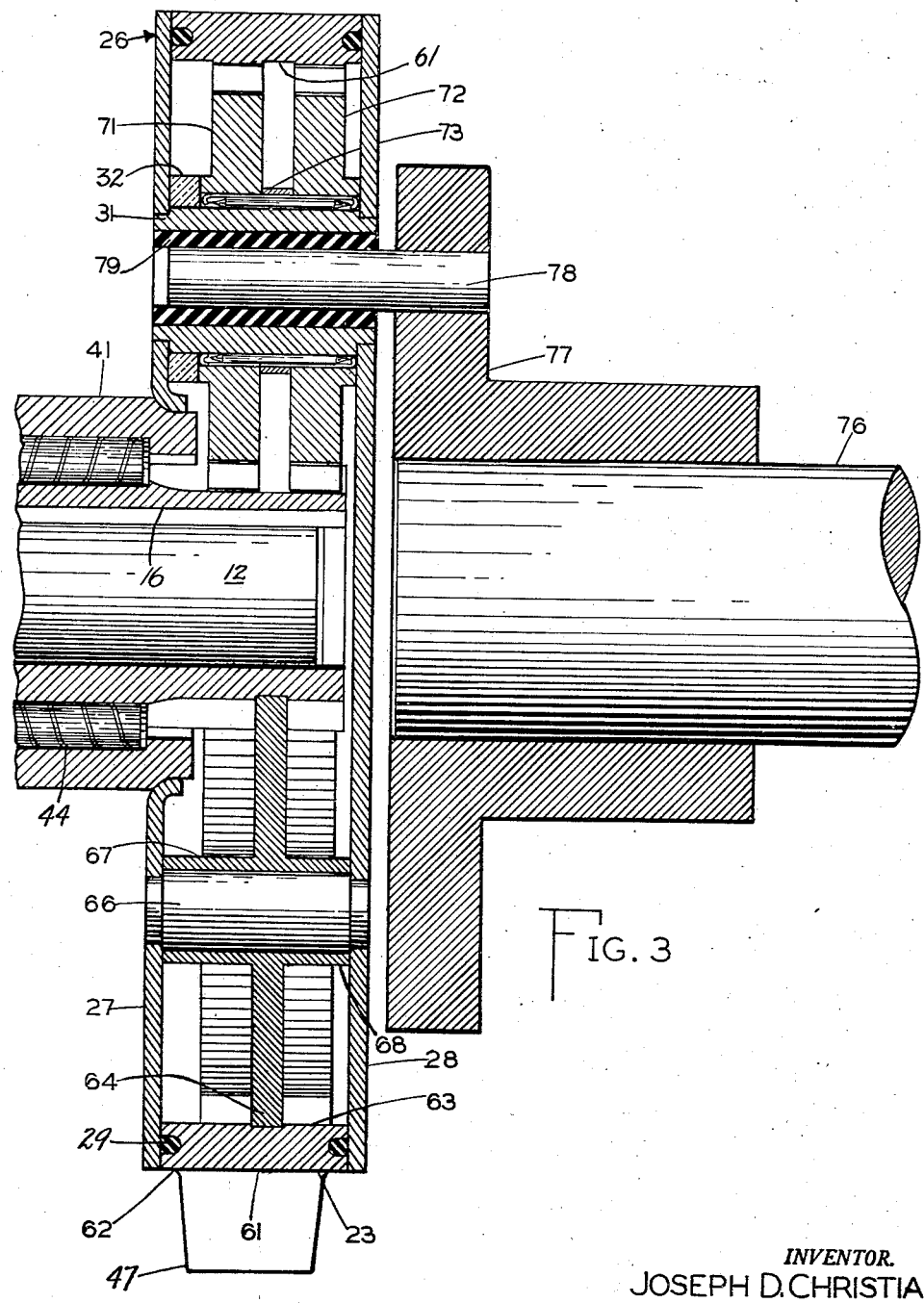
Figure 3 is a section through another form of power transmission device embodying this invention showing how the device can be coupled directly to a power input shaft.
Figure 4:
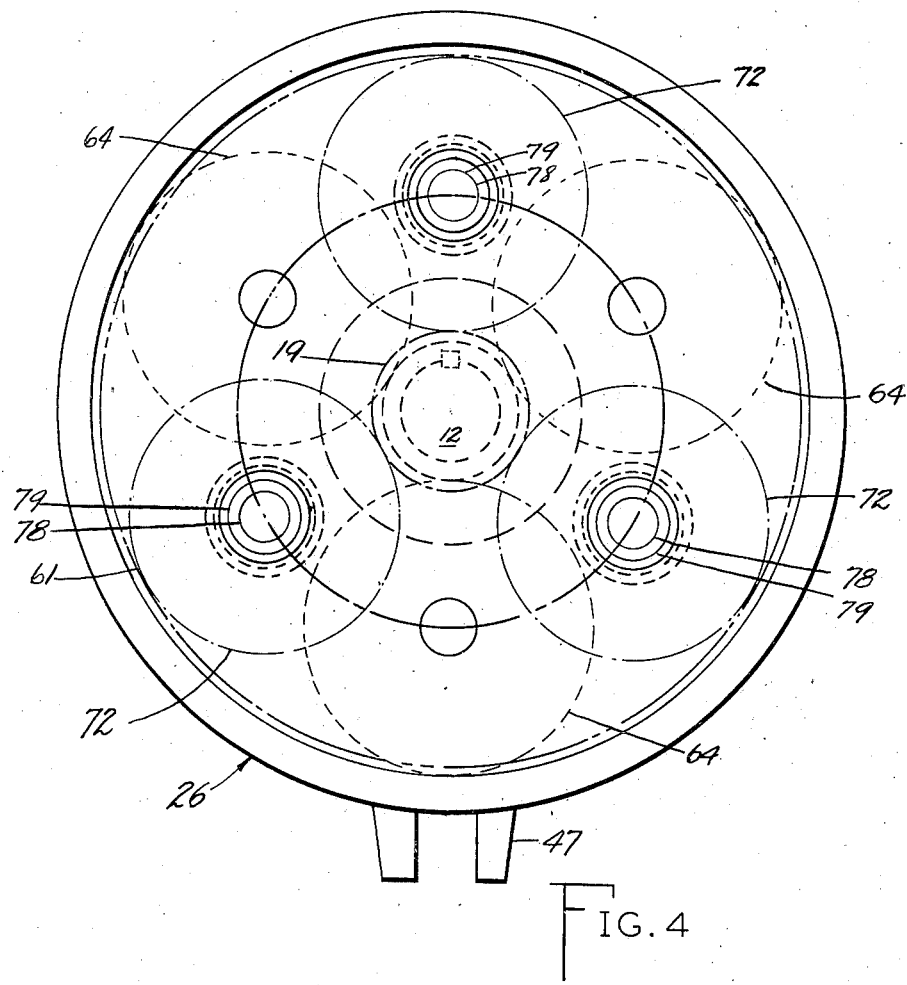
Figure 4 is an end view of only the transmission device shown in Figure 3.

In the device shown in Figure 3, the same principles of construction are employed. However, in this case, ring 23 is made up with a track 61 separating ring gear teeth 62 and 63. Guide rollers 64 are provided on shafts 66 mounted for rotation in the casing walls 27 and 28. Spacers 67 and 68 are provided on each side of the rollers to retain them in position. This construction requires the use of double planet gears 71 and 72, a spacer 73 being placed between them corresponding to the width of roller 64.

Figure 3 also differs from the showing in Figure 1 in that instead of depending upon power take-off unit 41, the casing 26 is, in effect, directly coupled to the unit to be driven. To illustrate this, I have shown shaft 76 as extending from such a unit and having a flanged member 77 secured thereto by suitable means, not shown.

To couple the casing 26 to the flanged member 77, pins 78 are provided in the flanged member at suitable spaced points to extend into each of the hollow bearing mounts 31 for the three planet gears. To provide for a flexible mounting so that the motor shaft 12 and the shaft 76 need not be in exact alignment, flexible coupling means are interposed between pins 78 and their connection to the casing 26; in the form shown these are indicated by rubber bushings 79. These permit shaft 76 to be offset slightly or to be out of absolute alignment with shaft 12 without affecting adversely the operation of the reduction unit or of the motor.

Figure 5:
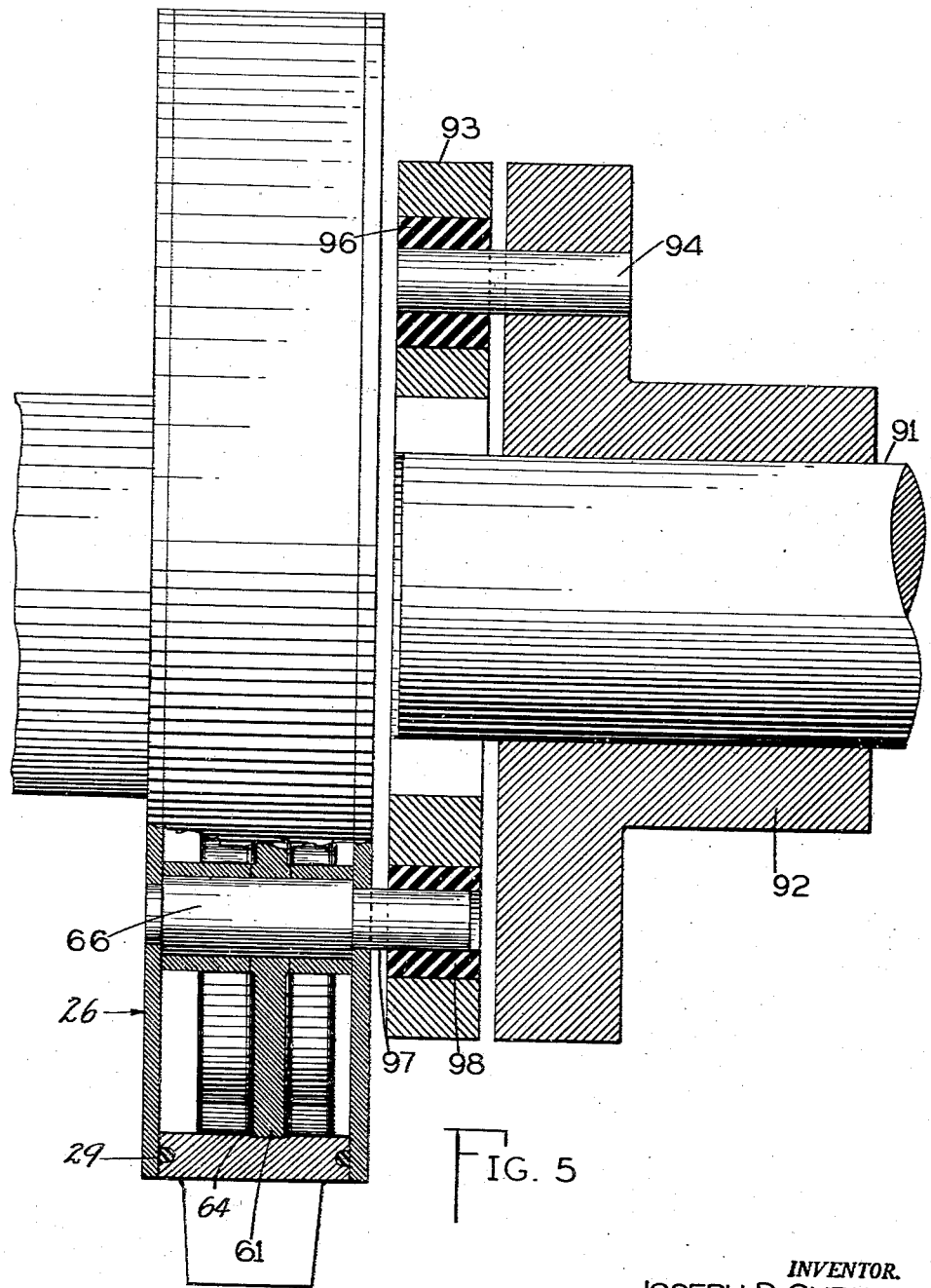
Figure 5 is a side elevation partly in section showing another manner of direct coupling of the power transmission device to a power input shaft.

Another modified form of coupling between the reduction unit shown in Figure 3 and a power input shaft is indicated in Figure 5, wherein I have shown a shaft 91 as carrying a flanged member 92 secured thereto by suitable means, not shown.

An annulus 93 is also provided and is supported upon the flanged member 92 by three pins 94 spaced about the flanged member 92 and extending into suitable rubber bushings 96 in the annulus 93. Shafts 66 provided for mounting of rollers 61 are provided with extending ends 97 and these are engaged by rubber bushings 98 mounted in the annulus 93. Thus flexing can occur between the rubber bushings 98 and rubber bushings 96.

Certain modifications can be made in the structures disclosed without departing from my invention as the same is set forth in each of the appended claims. For example, one can employ one or more planet gears; while I have disclosed the use of three, this is only by way of illustration and one can use one, two, three or more as is desired. Also, while it is preferable to have the power take-off device 41 as close to the motor bearing supporting the cantilever motor shaft, the unit can be reversed and the take-off device can hang over and extend beyond the end of the motor shaft as an extension integral with and adequately supported by casing 26. Further, the outer periphery of the ring gear can be formed to receive a V-belt, a flat belt or can have gear teeth so that it acts as the power take-off device. In this case, the planet gear bearing support, casing 26, would be held stationary as by securing pins 78 (Figure 3) to a fixed support. The ring gear can also be joined to wall member 27 to which the take-off 41 is attached, the planet gears being only supported from wall 28 which is independently supported on a bearing on bushing 16 which is extended to receive the bearing.

I claim:

1. In combination, a motor having a shaft extending therefrom, a first sleeve mounted on said shaft for rotation by said shaft, a pinion gear on said first sleeve adjacent the common end of said sleeve and said shaft, a second sleeve, bearing means between said first and second sleeves supporting said second sleeve for rotation on said first sleeve, a plurality of planet gears mounted for rotation about and in mesh with said pinion gear, a first plate mounted on an end of said second sleeve and supporting said planet gears on one side of said planet gears, a second plate mounted on and supporting said planet gears on the other side thereof, a ring gear positioned between said plates and surrounding said planet gears in mesh therewith, means for sealing said ring gear to each of said first and said second plates, and means for retaining said ring gear against rotation.

2. In combination, a motor having a shaft extending therefrom, a first sleeve mounted on said shaft for rotation by said shaft, a pinion gear on said first sleeve adjacent the common end of said sleeve and said shaft, a second sleeve, bearing means between said first and second sleeves supporting said second sleeve for rotation on said first sleeve, a plurality of planet gears mounted for rotation about and in mesh with said pinion gear, a first plate mounted on an end of said second sleeve and supporting said planet gears on one side of said planet gears, a second plate mounted on and supporting said planet gears on the other side thereof, a ring gear positioned between said plates and surrounding said planet gears in mesh therewith, means for sealing said ring gear to each of said first and said second plates, and power takeoff means on said second sleeve.

3. In combination, a motor having a shaft extending therefrom, a first sleeve mounted on said shaft for rotation by said shaft, a pinion gear on said first sleeve adjacent the common end of said sleeve and said shaft, a second sleeve, bearing means between said first and second sleeves supporting said second sleeve for rotation on said first sleeve, a plurality of planet gears mounted for rotation about and in mesh with said pinion gear, a first plate mounted on an end of said second sleeve and supporting said planet gears on one side of said planet gears, a second plate mounted on and supporting said planet gears on the other side thereof, a ring gear positioned between said plates and surrounding said planet gears in mesh therewith, means for sealing said ring gear to each of said first and said second plates, and power takeoff means positioned adjacent said second plate and engaged for driving by said planet gear.

4. In combination, a motor having a shaft extending therefrom, a first sleeve mounted on said shaft for rotation by said shaft, a pinion gear on said first sleeve adjacent the common end of said sleeve and said shaft, a second sleeve, bearing means between said first and second sleeves supporting said second sleeve for rotation on said first sleeve, a plurality of planet gears mounted for rotation about and in mesh with said pinion gear, a first plate mounted on an end of said second sleeve and supporting said planet gears on one side of said planet gears, a second plate mounted on and supporting said planet gears on the other side thereof, a ring gear positioned between said plates and surrounding said planet gears in mesh therewith, means for sealing said ring gear to each of said first and said second plates, a plurality of bearing means supported between said plates and supporting the ring gear independently of said planet gears, and means for retaining said ring gear against rotation.

5. A speed change device adapted to be mounted directly on an end of a cantilever shaft, the device comprising, a first sleeve mounted on said shaft for rotation by said shaft, a pinion gear on said first sleeve adjacent the common end of said sleeve and said shaft, a second sleeve, bearing means between said first and second sleeve supporting said second sleeve for rotation on said first sleeve, a plurality of planet gears mounted for rotation about and in mesh with said pinion gear, a first plate mounted on an end of said second sleeve and supporting said planet gears on one side of said planet gears, a second plate mounted on and supporting said planet gears on the other side thereof, a ring gear positioned between said plates and surrounding said planet gears in mesh therewith, means for sealing said ring gear to each of said first and said second plates, and means for retaining said ring gear against rotation.

JOSEPH D. CHRISTIAN.